US012283767B2

(12) United States Patent
Carbaugh et al.

(10) Patent No.: US 12,283,767 B2
(45) Date of Patent: Apr. 22, 2025

(54) TERMINAL SPRING SPACER, AND A FEMALE TERMINAL UTILIZING SAID SPRING SPACER

(71) Applicant: J.S.T. CORPORATION, Farmington Hills, MI (US)

(72) Inventors: Philip Anthony Carbaugh, Singapore (SG); Preston Carter Costella, Singapore (SG)

(73) Assignee: J.S.T. CORPORATION, Farmington Hills, MI (US)

( * ) Notice: Subject to any disclaimer, the term of this patent is extended or adjusted under 35 U.S.C. 154(b) by 169 days.

(21) Appl. No.: 17/986,686

(22) Filed: Nov. 14, 2022

(65) Prior Publication Data

US 2024/0079810 A1 Mar. 7, 2024

Related U.S. Application Data

(60) Provisional application No. 63/403,640, filed on Sep. 2, 2022.

(51) Int. Cl.
*H01R 13/11* (2006.01)
*H01R 13/03* (2006.01)

(52) U.S. Cl.
CPC ............ *H01R 13/113* (2013.01); *H01R 13/03* (2013.01)

(58) Field of Classification Search
CPC .............................. H01R 13/113; H01R 13/03
USPC .......................................... 439/839, 845, 847
See application file for complete search history.

(56) References Cited

U.S. PATENT DOCUMENTS 8,366,497 B2 2/2013 Glick
8,475,220 B2 7/2013 Glick
8,988,655 B2 3/2015 Aoki
8,998,655 B2 4/2015 Glick
9,537,241 B2 * 1/2017 Rivera ................ H01R 13/113
2012/0289101 A1 11/2012 Lee
2016/0344122 A1 11/2016 Dated
(Continued)

OTHER PUBLICATIONS

International Search Report for International Application No. PCT/US2022/050256 dated Apr. 25, 2023 (5 sheets).
(Continued)

*Primary Examiner* — Phuong K Dinh
(74) *Attorney, Agent, or Firm* — Kratz, Quintos & Hanson, LLP

(57) ABSTRACT

A terminal spring on a female terminal that integrates a terminal spring spacer to underlying terminal bases of said terminal spring to aid in maintaining proper contact interface gap for receiving therein a corresponding male terminal. The terminal spring spacer is integrally, contiguously, or unitarily connected to said terminal spring as a single piece. The female terminal, onto which the terminal spring with the terminal spring spacer is joined, includes a pair of terminal bases, each having a contact zone, a transition zone, and a terminal (wire) zone. The contact zones and transition zones of the first and second terminal bases are substantially contained within the terminal spring. The terminal spring spacer effectively maintains a correct gap through an interface gap between front ends of the contact zones of the first and second terminal bases through another gap between transition zones of the first and second terminal bases for accommodating therein the corresponding male terminal.

15 Claims, 4 Drawing Sheets

(56) References Cited

U.S. PATENT DOCUMENTS

| | | | |
|---|---|---|---|
| 2019/0081425 | A1 | 3/2019 | Glick |
| 2020/0366021 | A1 | 11/2020 | Meixner |
| 2020/0395700 | A1 | 12/2020 | Pavlovic |
| 2021/0265751 | A1 | 8/2021 | Lou |
| 2021/0281001 | A1 | 9/2021 | Klawinski |

OTHER PUBLICATIONS

Written Opinion of the International Searching Authority for International Application No. PCT/US2022/050256 dated Apr. 25, 2023 (8 sheets).

* cited by examiner

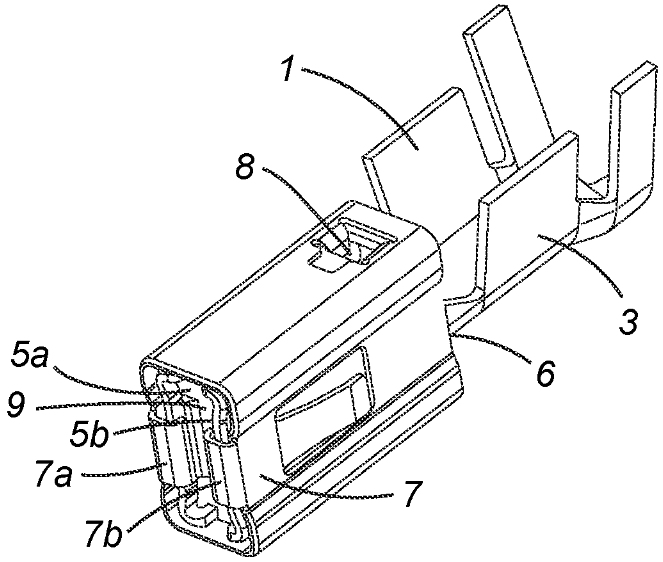
Fig. 1
PRIOR ART
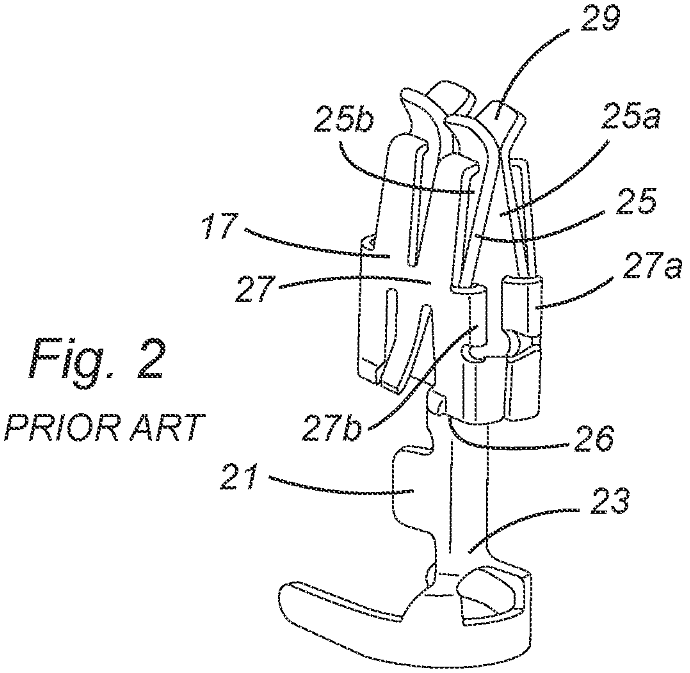
Fig. 2
PRIOR ART
Fig. 3
PRIOR ART
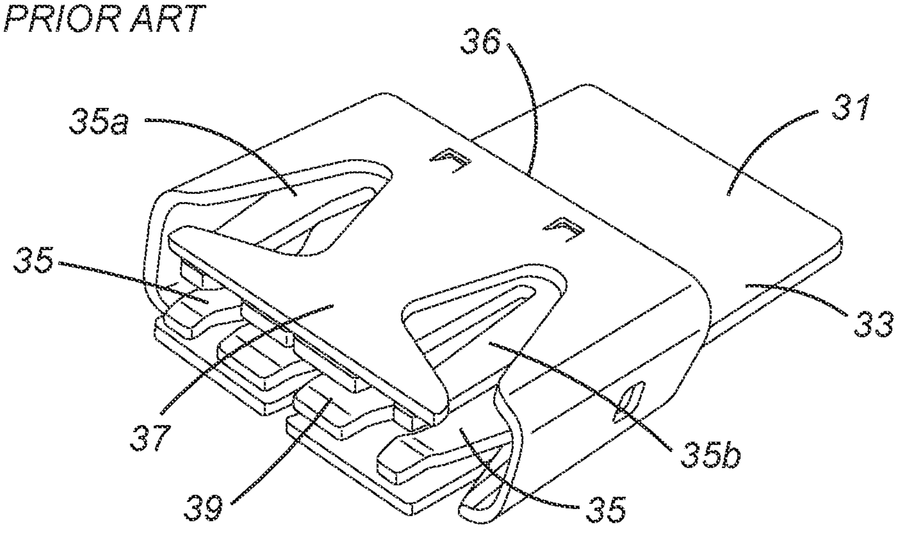

TERMINAL SPRING SPACER, AND A FEMALE TERMINAL UTILIZING SAID SPRING SPACER

CROSS-REFERENCE TO RELATED APPLICATION

This patent application claims priority to U.S. Provisional Patent Application No. 63/403,640 filed Sep. 2, 2022, which is hereby incorporated herein by reference in its entirety.

BACKGROUND OF THE INVENTION

Electrical terminals, at their most fundamental level, includes at least two elements; namely, a male terminal and a female terminal. Together, the male terminal and the female terminal form a terminal system with each component intending to remain in contact with the other when the terminal system is in operation.

A terminal system is best thought of as an electrical joint design or structure for allowing electrical energy to flow through it uninterrupted with as little lost of electrical energy as possible. This lost in electrical energy through the terminal system is measured as a voltage drop (i.e., a reduction in voltage or electric potential), and is likely to be manifested as heat. Designs of such terminal systems can take on an almost infinite number of designs and structural arrangements. Despite this infinite number designs or possible structural arrangements for the terminal systems, they often share some common elements or characteristics. Some such common elements or characteristics include the minimum number of two elements or a pair of elements that make up a terminal system, such pair of elements being defined as a joint. Each pair of elements or joint consists of one male and one female. The elements are made of a highly conducting metal (e.g., copper or aluminum with a surface that may be covered in silver, gold, nickel, or tin).

Moreover, terminal systems are designed or made to be serviceable, so as to have the elements thereof mated (or joined) and unmated (or disjoined). The designs or configurations of the terminal systems often rely on the elastic nature of the material (i.e., the metal) of the female element to allow for joining with or disjoining from the male element. The terminal systems are, generally, attached to the end of a cable or a wire. As a result of the terminal systems being attached to the end or a cable or a wire, the terminal systems have an area for attaching to the cable or the wire by mechanical crimp, welding, soldering, brazing, or the like. Most, if not all, of the terminal systems are designed or configured to be a "housing" in a non-conductive material for handling or insulating at least another conductive element in proximity.

Lastly, terminal systems that house other terminals include, for example, plugs at the end of a cord, which is meant to be "plugged" into a wall outlet; USB connectors; headphone jacks; Ethernet RJ45 connectors, corded phone lines, or the like.

As shown in FIGS. 1-3, conventional terminals are each illustrated with a terminal base and a terminal spring. In FIG. 1, for instance, the conventional terminal includes a terminal base 1, and a terminal spring member 7. The terminal base 1 includes a rear portion 3 and front portion 5, the front portion 5 of the terminal base 1 being housed inside the terminal spring member 7. The terminal base 1 allows the rear portion 3 thereof to crimp a cable or a wire (not shown), while allowing a leading end 9 of the front portion 5 of the terminal base 1 to resiliently receive therein a, e.g., device terminal (not shown).

The conventional terminal shown in FIG. 2 includes a terminal base 21 and a terminal spring 27. The terminal base 21 includes a rear portion 23 and front portion 25, the front portion 25 of the terminal base 21 being housed inside the terminal spring 27. The terminal base 21 allows the rear portion 23 thereof to crimp a cable or a wire (not shown), while allowing a leading end 29 of the front portion 25 of the terminal base 21 to resiliently receive therein a, e.g., device terminal (not shown).

The conventional terminal shown in FIG. 3 includes a terminal base 31 and a terminal spring 37. The terminal base 31 includes a rear portion 33 and front portion 35, the front portion 35 of the terminal base 31 being housed inside the terminal spring 37. The terminal base 31 allows the rear portion 33 thereof to crimp a cable or a wire (not shown), while allowing a leading end 39 of the front portion 35 of the terminal base 31 to resiliently receive therein a, e.g., device terminal (not shown).

As explained above, each the conventional terminals illustrated in FIGS. 1-3 employs a terminal spring member 7, 27, 37 in combination with its terminal base 1, 21, 31, respectively. As seen in FIGS. 1-3, each of the front portions 5, 25, 35 of each of the terminal bases 1, 21, 31 has a pair of front portions 5*a*/5*b*, 25*a*/25*b*, 35*a*/35*b*, respectively. The pair of front portions 5*a*/5*b*, 25*a*/25*b*, 35*a*/35*b* in the terminal bases 1, 21, 31 of the terminals illustrated FIGS. 1, 2, and 3, respectively, receives a male terminal (or mating terminal) (not shown), and must accommodate therein the male terminal. However, in the conventional terminals of FIGS. 1-3, there is no assurance that the gap between the pair of front portions 5*a*/5*b*, 25*a*/25*b*, 35*a*/35*b* are maintained; and thus, there is no assurance that the male terminals, to be received therebetween, will be fully received therein and fully accommodated therebetween. It is essential that the male terminals received within the front portions 5*a*/5*b*, 25*a*/25*b*, 35*a*/35*b* of the terminal bases 1, 21, 31 travel fully towards a certain point (e.g., at a point in a transition portion 6, 26, 36) between the front portions 5, 25, 35 and the the rear portions 3, 23, 33 in each of the terminal bases 1, 21, 31 to ensure that the male terminals contact the e.g., cable or wire received or crimped at the rear portions 3, 23, 33 of the terminal bases 1, 21, 31. In other words, the necessary space between the front front portions 5*a*/5*b*, 25*a*/25*b*, 35*a*/35*b* of the terminal bases 1, 21, 31 must be maintained, but cannot be assured in the conventional terminals of FIGS. 1-3, this space being essential for ensuring that the male terminals received therein travel fully towards a certain point in the transition portions 6, 26, 36 to be able to contact the cable or wire received in the rear portions 3, 23, 33 of the terminal bases 1, 21, 31.

In the conventional terminal illustrated in FIG. 1, forward stop members 7*a*/7*b* of the terminal spring 7 prevent the terminal base 1 from traveling too far forward. Also shown in FIG. 1 is rearward window 8 that serves as a rearward stop. In the conventional terminal illustrated in FIG. 2, locking members 27*a*/27*b* of the spring member 27 lock the spring member 27 to the terminal base 21. However, to include the above-discussed forward stop members 7*a*/7*b* (in the conventional terminal of FIG. 1) or locking members 27*a*/27*b* (in the conventional terminal of FIG. 2) require that the forward stop members 7*a*/7*b* or the locking members 27*a*/27*b* have the additional stamping manufacturing processes in the blank states thereof, which are undesired inefficient added steps in the manufacturing of the conventional terminals of FIGS. 1 and 2. Moreover, the forward stop members 7*a*/7*b* and the locking members 27*a*/27*b* are required to be folded (at, e.g., 90 degrees), as shown in FIGS. 1 and 2, respectively, for stopping the respective front portions 5*a*/5*b* of the terminal base 1 or for locking the respective front portions 25*a*/25*b* of the terminal base 2. These required configurations or structural arrangements for the forward stop members 7*a*/7*b* or the locking members 27*a*/27 require that the adjoining portions of the respective front portions 5, 25 of the terminal bases 1, 21 be widened, which results in a disadvantageous increase of scrap material during the manufacturing of the conventional terminals of FIGS. 1 and 2.

If, on the other hand, no forward stop members 7*a*/7*b* or no locking members 27*a*/27 are provided for the terminal spring members 7, 27 in the terminals illustrated in FIGS. 1 and 2, there is no assurance that the gap between the respective front portions 5*a*/5*b*, 25*a*/25*b* of the terminal bases 1, 21 can be maintained, and that the gap tolerance may be inconsistent (i.e., may be too large or too small). This is exemplified in the conventional terminal shown in FIG. 3 where no such forward stop member or locking member is provided by its spring member 37 for the front portions 35*a*/35*b* of its terminal base 31. Thus, in the conventional terminal of FIG. 3, the essential gap (and essential tolerance thereof) between its front portions 35*a*/35*b* of the terminal base 31 for fully accommodating the male terminal therein, which is essential for the reasons discussed above, cannot be assured.

SUMMARY OF THE INVENTION

A spring on a female terminal that integrates a secondary spacer member or structure to the underlying base terminal to aid in maintaining proper contact interface gap width, for receiving therein a corresponding male terminal, is exemplified in the invention described and claimed herein, so as to provide a significantly improved female terminal that can be efficiently and effectively manufactured at a reduced manufacturing cost over other conventional terminals and conventional terminal manufacturing methods. The female terminal of this invention, which avoids the above problems and disadvantages of the conventional terminals, includes a terminal base and a terminal spring, the terminal spring having a spacer member or structure. The terminal base includes a first terminal base portion and a second terminal base portion. The first terminal base portion and the second terminal base portion join together to form a fully assembled terminal base. Each of the first terminal base portion and the second terminal base portion includes a contact zone, and transition zone, and a termination (wire) zone, and is preferably made of copper. The contact zones of the of the first and second base portions of the female terminal of this invention provide a spring function, and by having the spacer member or structure between the transition zones of the first and second base portions when securing therebetween a male terminal, the spring function is maintained, and a correct gap between the respective contact zones and the transition zones of the first and second terminal base portions is maintained. The female terminal, with the spacer member or structure, eliminates the need for the tabs, as discussed above, with respect to the conventional terminals, and maintains a consistent and proper contact interface gap with the corresponding male terminal at the contact zones of the first and second base portions. This invention further reduces the manufacturing cost of the female terminals by allowing for more terminals to be produced from a given length of stock.

BRIEF DESCRIPTION OF THE DRAWINGS

FIG. 1 is a perspective view of a conventional female terminal having a terminal spring and a terminal base held within the terminal spring.

FIG. 2 is perspective view of another conventional female terminal having a terminal spring and a terminal base held within the terminal spring.

FIG. 3 is a perspective view of yet another conventional female terminal having a terminal spring and a terminal base contained within the terminal spring.

DETAILED DESCRIPTION OF THE PREFERRED EMBODIMENTS

Figure 4:
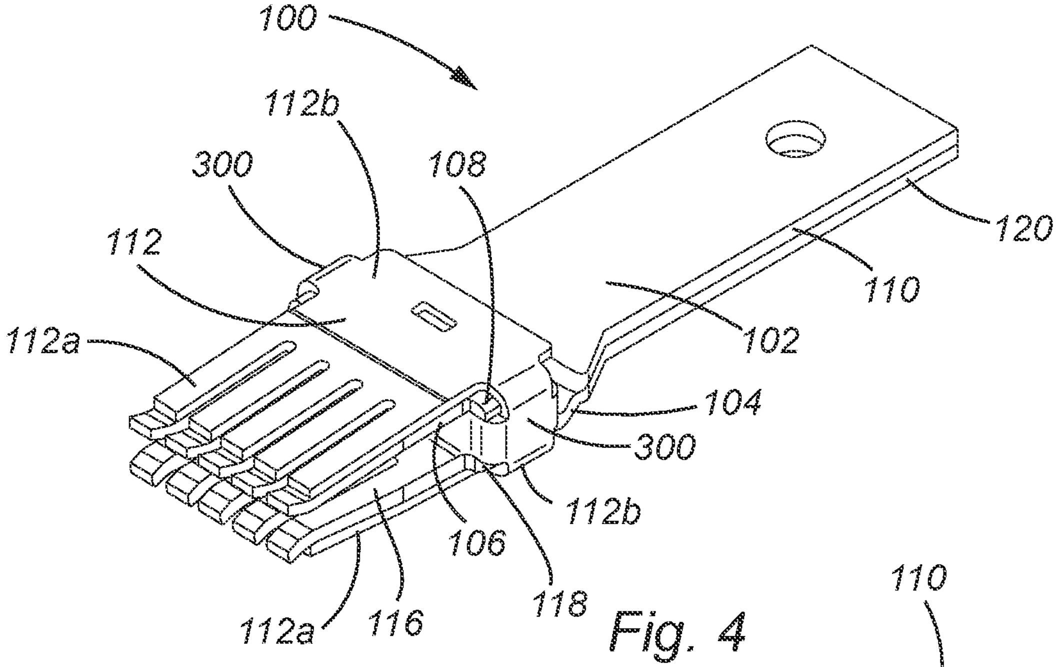
FIG. 4 is a perspective view of a fully-assembled female terminal of this invention showing a pair of first terminal base and a second terminal base with a terminal spring, which contains therein contact zones and a transition zones of the first and second terminal bases, and further showing a spacer member or structure located between the transition zones of the first and second base portions.

FIG. 4 is a perspective view of a fully-assembled female terminal, generally referred to as reference 100, of this invention. The female terminal 100 includes a pair of first terminal base 102 and a second terminal base 104 with a terminal spring 112. As more fully discussed below, the first terminal base 102 includes a contact zone 106, a transition zone 108, and a terminal (wire) zone 110. Similarly, the second terminal base 104 includes a contact zone 116, a transition zone 118, and a terminal (wire) zone 120. The first terminal base 102 and the second terminal base 104 are, structurally, identical; in other words, during assembly of the female terminal 100, the second terminal base 104 is a “flip-over” of the first terminal base 102. At least the contact zone 106 and the transition zone 108 of the first terminal base 102, and the contact zone 116 and the transition zone 118 of the second terminal base 104 are, in part, contained within the terminal spring 112. The terminal spring 112, as generally illustrated in FIG. 4, includes a front portion 112*a* and a rear portion 112*b*.

Figure 5:
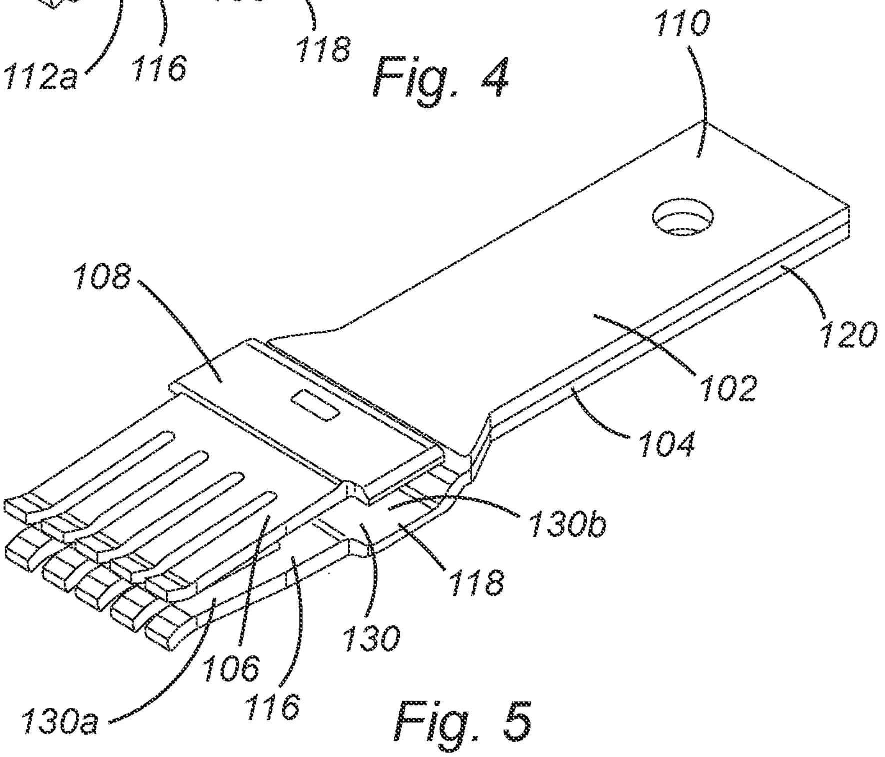
FIG. 5 is a perspective view of the pair of the first terminal base and the second terminal base, one being mounted above the other, showing the respective contact zones, transition zones, and terminal (wire) zones of the first and second base portions, an inner face of the first terminal base facing an inner face of the second terminal base.

It is preferable that each of the of the first terminal base 102 and the second terminal base 104 be made of a highly conductive metal (such as, copper, aluminum, or the like), with a surface that is covered in, e.g., silver, gold, nickel, tin, or the like). As discussed above, the first terminal base 102 and the second terminal base 104 are, structurally, identical, and the second terminal base 104 is a “flip-over” of the first terminal base 102; and the first terminal base 102 is mounted onto the second terminal base 104, as illustrated in FIG. 5. With the above-described structural arrangement of the first terminal base 102 and the second terminal base 104 being structurally identical, the female terminal 100 of this invention allows for more terminals to be produced from a given length of stock, thereby, making the manufacturing of the female terminal 100 efficient; and thus, the manufacturing cost of the female terminal 100 of this invention is reduced. The first terminal base 102 or the second terminal base 104 is preferably, although not limited thereto, unitary, contiguous or a single piece.

As more fully discussed below, a spacer member or structure 300 (or terminal spring spacer 300) is joined, connected, or integrated onto the rear portion 112*b* of the terminal spring 112, and respectively comprises side portions of the rear portion 112*b* of the terminal spring 112.

As further shown in FIG. 5, when the terminal base is fully assembled or when the pair of the first terminal base 102 and the second terminal base 104 are assembled together (i.e., the first terminal base 102 placed or mounted onto the second terminal base 104, or vice versa), the contact zone 106, the transition zone 108, and terminal (wire) zone 110 of the first terminal base 102 directly face contact zone 116, the transition zone 118, and the terminal (wire) zone 120, respectively, of the second terminal base 104. The fully assembled terminal base forms a gap 130 that extends from a gap 130*a* (between the contact zones 106, 116 of the first and second base terminals 102, 104, respectively) through a gap 130*b* (between the transition zones 108, 118 of the first and second base terminals 102, 104, respectively).

Figure 6A:
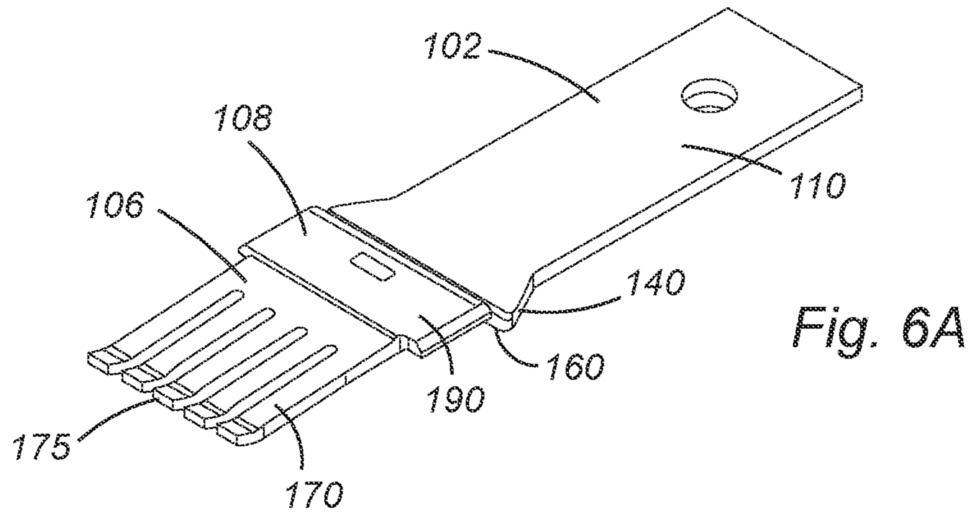
FIG. 6A is a perspective view of the first terminal base showing the contact zone, transition zone, and terminal (wire) zone thereof, the contact zone having a plurality of first flexible fingers extending from the transition zone.
Figure 6B:
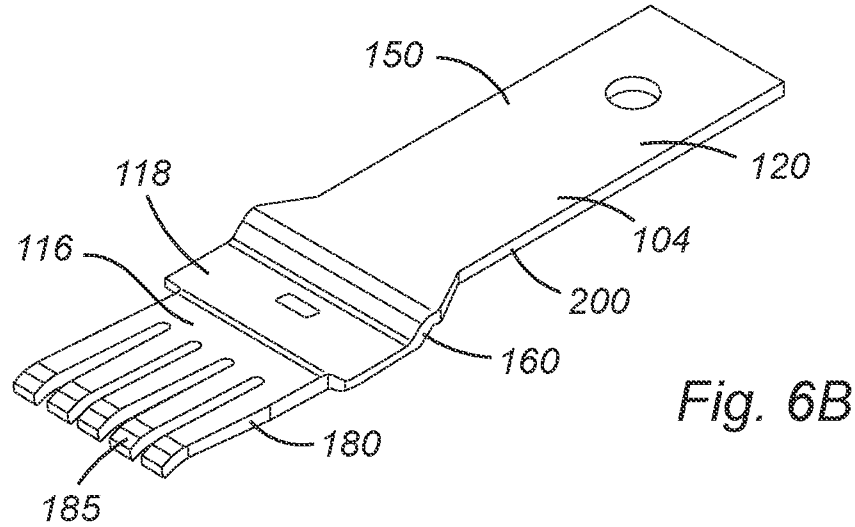
FIG. 6B is a perspective view of the second terminal base showing the contact zone, transition zone, and terminal (wire) zone thereof, the contact zone having a plurality of second flexible fingers, the first terminal base and the second terminal base being structurally identical.

More particularly, when the terminal base is fully assembled, as illustrated in FIG. 5, an inside face or side 140 (see, FIGS. 6A and 6B) of the first terminal base 102 directly faces an inside face or side 150 (see, FIGS. 6A and 6B), of the second terminal base 104 such that: the contact zone 106 of the first terminal base 102 directly faces the contact zone 116 of the second terminal base 104; the transition zone 108 of the first terminal base 102 directly faces the transition zone 118 of the second terminal base 104; and the terminal (wire) zone 110 of the first terminal base 102 directly abuts against the terminal (wire) zone 120 of the second terminal base 104. In the second terminal base 104 in FIG. 6B, it is clearly shown that a portion 160 of the of the transition zone 118 extends at at least an angle (or at different multiple angles) towards the terminal (wire) zone 120. In this manner, the plane of extension of the terminal (wire) zone 120 differs from the planes of extension of the corresponding transition zone 118 and contact zone 116. Because the second terminal base 104 (as shown in FIG. 6B) is structurally identical to the first terminal base 102 (as shown in FIG. 6A), the second terminal base 104 being a “flip-over” of the first terminal base 102, a similar portion 160, as described above with respect to the second terminal base 104, exists between the transition zone 108 and the terminal (wire) zone 110 of the first terminal base 102 of FIG. 6A. At least a portion of the angled portion 160 in each of the first terminal base 102 and the second terminal base 104 is the furthest point forward for the first terminal base 102 to be in contact with the second terminal base 104.

As further illustrated in FIG. 6A, the contact zone 106 of the first terminal base 102 includes a plurality of fingers 170 that extend from the adjoining transition zone 108, the plurality of fingers 170 having respective ends 175 that extend, at an angle and at a direction towards an outer face 190 of the first terminal base 102. Similarly, as illustrated in FIG. 6B, the contact zone 116 of the second terminal base 104 includes a plurality of fingers 180 that extend from the adjoining transition zone 118, the plurality of fingers 180 having respective ends 185 that extend, at an angle and at a direction towards an outer face 200 of the second terminal base 104.

Figure 7:
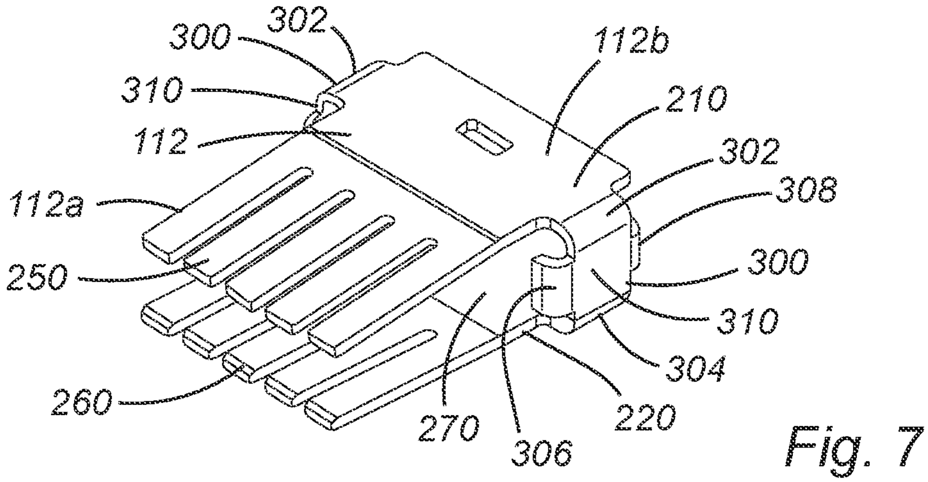
FIG. 7 is perspective view of the terminal spring having an upper portion and a lower portion that are symmetrical in shape, the terminal spring having the spacer member or structure attached onto each of the sides of thereof.

The terminal spring 112, as illustrated in FIG. 7, includes, as discussed above with respect to FIG. 4, the spacer member or structure 300, which is attached, joined, connected, or integrated onto the rear portion 112*b* of the terminal spring 112, and respectively comprises side portions of the rear portion 112*b* of the terminal spring 112. The terminal spring 112 has an upper portion 210 and a lower portion 220 that are symmetrical in shape, the terminal spring 112 having the spacer member or structure 300 attached, joined, connected, or integrated onto each of the sides of the rear portion 112*b* of the terminal spring 112. Each of the upper portion 210 and the lower portion 220 of the front portion 112*a* of the terminal spring 112 includes a set of upper fingers 250 that extends from the upper portion 210 of the rear portion 112*b* of the terminal spring 112, and a set of lower fingers 260 that extends from the lower portion 220 of the rear portion 112*b* of the terminal spring 112. Although it is preferable that the set of upper fingers 250 that extends from the upper portion 210 of the rear portion 112*b* of the terminal spring 112 and the set of lower fingers 260 that extends from the lower portion 220 of the rear portion 112*b* of the terminal spring 112 extend at directions toward each other, the directions of extension of the set of upper fingers 250 and the set of lower fingers 260 are not limited thereto, and may respectively extend from the rear portion 112*b* of the terminal spring 112 along a substantially the same plane along which the rear portion 112*b* of the terminal spring 112 extend. Further, the terminal spring 112 is preferably, although not limited thereto, unitary, contiguous, or a single piece.

Between the sets of upper fingers 250 and lower fingers 260 of the front portion 112*a* of the terminal spring 112 is a gap 270 that extends from the front portion 112*a* through the rear portion 112*b* of the terminal spring 112. As was previously discussed above with respect to FIG. 4 and will be discussed below with respect to FIG. 9, the gap 270, which extends from the front portion 112*a* through the rear portion 112*b* of the terminal spring 112, substantially accommodates therein, at least a portion thereof or in their entireties, the contact zone 106 and the transition zone 108 of the first terminal base 102, and the contact zone 116 and the transition zone 118 of the second terminal base 104.

The spacer member or structure 300, as illustrated in FIG. 7, preferably has an upper member 302, a lower member 304, a front member 306, and a rear member 308, which respectively extend from a central member 310. Although the central member 310 is generally shown as a flat member, its configuration, shape, or overall structural arrangement is not limited thereto. As further shown in FIG. 7, the upper member 302 of the spacer member or structure 300 is preferably integrally, contiguously, or unitarily connected to one side of the upper portion 210 of the rear portion 112*b* of the terminal spring 112. As also shown in FIG. 7, the lower member 304 of the spacer member or structure 300 is preferably integrally, contiguously, or unitarily connected to an opposing side of the lower portion 220 of the rear portion 112 of the terminal spring 112. Moreover, although the spacer member or structure 300 is, generally, integrated onto or integrally, contiguously, or unitarily attached, joined, or connected onto the rear portion 112*b* of the terminal spring 112, this structural arrangement is not limited thereto; that is, the spacer member or structure 300 of the terminal spring 112 may be welded, brazed, or the like onto the rear portion 112*b* of the terminal spring 112.

The functions or structural arrangements of the front member 306 and the rear member 308 that extend from the central member 310 of the spacer or structure 300 are discussed, in more detail, with respect to FIGS. 8 and 9, below. As more particularly discussed above with respect to FIG. 5, when the terminal base is fully assembled, an inside face or side 140 (see, FIG. 6A) of the first terminal base 102 directly faces an inside face or side 150 (see, FIG. 6B) of the second terminal base 104, such that: the contact zone 106 of the first terminal base 102 directly faces the contact zone 116 of the second terminal base 104; the transition zone 108 of the first terminal base 102 directly faces the transition zone 118 of the second terminal base 104; and the terminal (wire) zone 110 of the first terminal base 102 directly abuts against the terminal (wire) zone 120 of the second terminal base 104. The fully assembled terminal base forms the gap 130 that extends from the gap 130*a* (between the contact zones 106, 116 of the first and second base terminals 102, 14, respectively) through the gap 130*b* (between the transition zones 108, 118 of the first and second base terminals 102, 104, respectively). The gap 130*b* between the transition zones 108, 118 of the first and second base terminals 102, 204, respectively, includes on each side thereof (as shown in the rectangular-shaped dashed lines in FIG. 8) a side opening A. This side opening A exists in each of the opposing sides of the gap 130*b* formed between the transition zones 108, 118 of the first and second terminal bases 102, 104. Each side opening A accommodates thereon the spacer member or structure 300, as illustrated in FIG. 9. When a corresponding male terminal 400, shown in a schematic block box 400 in FIG. 9, enters the gaps 130*a* and 130*b* of the gap 130 between the contact zones 106, 116 and the transition zones 108, 118 of the first and second terminal bases 102, 104, and travels towards a furthest point or line, generally referred to as reference letter B, of the transition zones 108, 118 of the first and second terminal bases 102, 104, respectively.

As further illustrated in FIG. 9, the gaps 130*a* and 130*b* that form the gap 130 between the contact zones 106, 116 and the transitions zones 108, 118 of the first and second terminal bases 102, 104 (see also, FIGS. 5 and 8) receive therein the corresponding male terminal 400 (shown in FIG. 9 in a schematic block form), which initially enters (as shown in the arrow in FIG. 9) the gap 130*a* between the set of plurality of fingers 170 of the contact zone 106 of the first terminal base 102 and the set of plurality of fingers 180 of the contact zone 116 of the second terminal base 104. The male terminal 400 then further travels through the gap 130*b* between the transition zones 108, 118 of the first and second terminal bases 102, 104; and the male terminal 400 travels at the furthest point or line B of the transition zones 108, 118 of the first and second terminal bases 102, 104, as discussed above with respect to FIG. 8.

Figure 8:
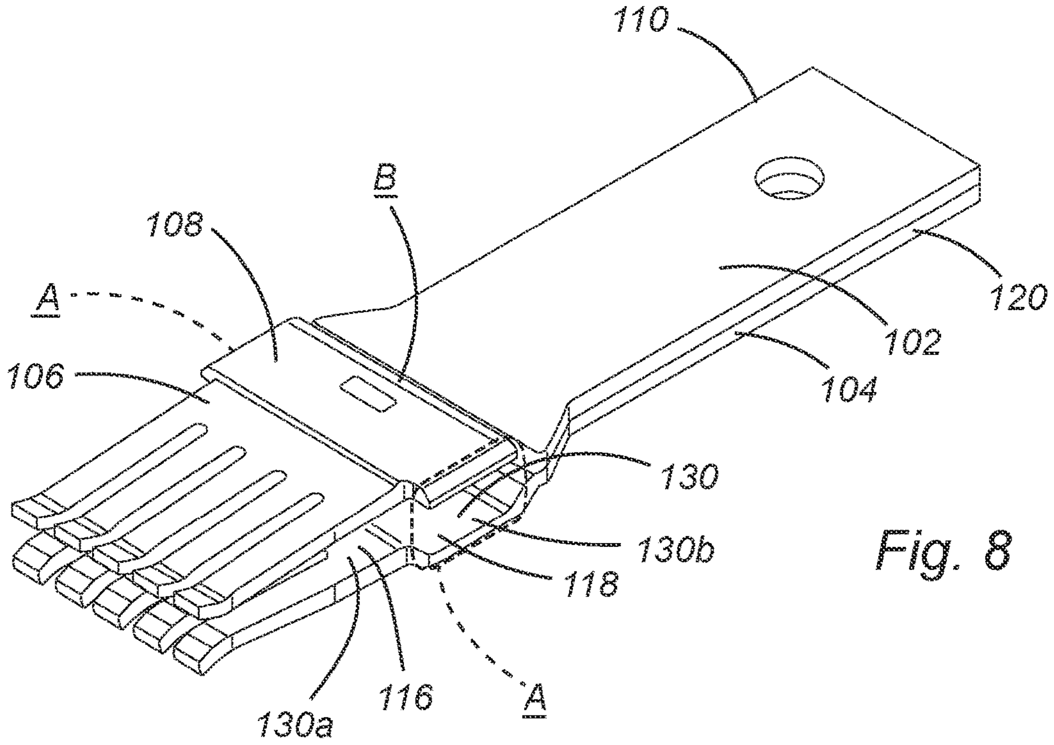
FIG. 8 is a perspective view of the pair of the first terminal base and the second terminal base with the inner face of the first terminal base facing the inner face of the second terminal base, as in FIG. 5, and further illustrates an opening or an open space on each of the sides thereof, which is shown in the rectangular-shaped dashed lines that signify the location for accommodating thereon the spacer member or structure.
Figure 9:
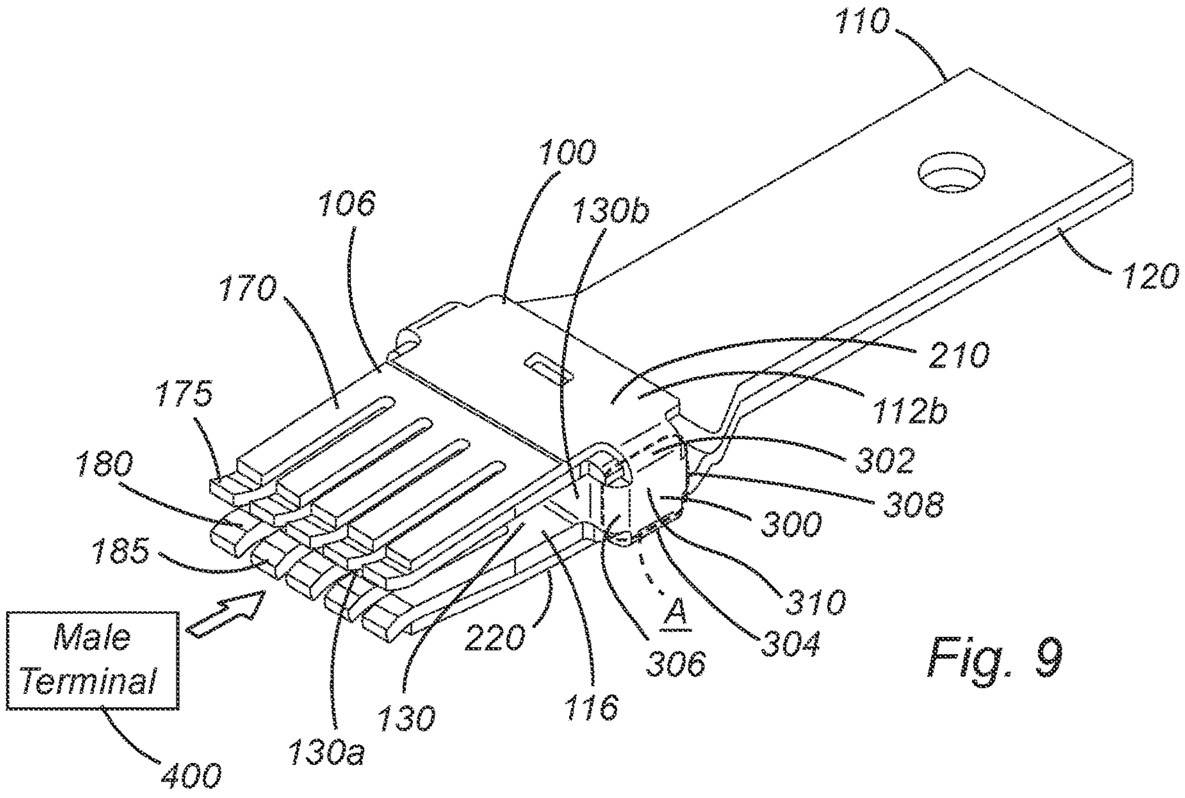
FIG. 9 is a perspective view of a fully-assembled female terminal of this invention, as in FIG. 1, showing the spacer member or structure mounted onto the terminal spring, the spacer member or structure forming one of opposing sides of the rear portion of the terminal spring.

As seen in FIG. 8, the opening A (in each of the opposing sides of the gap 130*b* formed between the transition zones 108, 118 of the first and second terminal bases 102, 104) does not have a tab (folded at, e.g., 90 degrees), as in the above-described conventional terminals of FIGS. 1 and 2, which would have otherwise required a stamping in a blanked state for the highly conductive transition zones 108, 118 of the first and second terminal bases 102, 104, at the openings A, to be sufficiently wider resulting in an undesired increase in scrap material during the manufacture thereof. That is, the avoidance in the use of tabs in these openings A reduces the manufacturing costs of the female terminal 100 of this invention. However, the lack of such tabs (as in the conventional terminal discussed above with respect to FIG. 3) cannot provide the needed support for maintaining the necessary gap, which receives the corresponding male terminal, and for assuring that such gap, which receives the male terminal, is not inconsistently large or small.

In the female terminal 100 of this invention, the spacer member or structure 300 is joined, connected, or integrated onto the rear portion 112*b* of the terminal spring 112, and respectively comprises side portions of the rear portion 112*b* of the terminal spring 112. Moreover, the spacer member or structure 300 covers the opening A shown in FIG. 8, in each of the opposing sides of the gap 130*b* formed between the transition zones 108, 118 of the first and second terminal bases 102, 104. More particularly, in each opening A that the spacer member or structure 300 covers, the upper member 302 of the spacer member or structure 300 is connected to the upper portion 210 of the rear portion 112*b* of the terminal spring 112, while the lower member 304 of the spacer member or structure 300 is connected to the lower portion 220 of the rear portion 112*b* of the terminal spring 112. The front member 306 and the rear member 308 of the spacer member or structure 300 are, at least partially, accommodated within the opening A and respectively support the side, at the side openings A of the transition zones 108, 118 of the first and second terminal bases 102, 104. With the front members 306 and the rear members 308 of the spacer members or structures 300 integrally joined to the opposing sides, at the side openings A, of the rear portion 112*b* of the terminal spring 112, the terminal spring 112 functions as a proper spacer; and in addition to the terminal spring's 112 (having the spacer members or structures 300) function of providing supplemental force to the highly conductive contact zones 106, 116 of the first and second base terminals 102, 104, the spacer members or structures 300 maintain a correct gap for the gap 130*a* (between the contact zones 106, 116 of the first and second base terminals 102, 104) through which the corresponding male terminal 400 first enters.

More particularly, the spacer members or structures 300 maintain a correct gap for the gap 130*a* between ends 175 of the set of plurality of fingers 170 of the contact zone 106 of the first terminal base 102 and the ends 185 of the set of plurality of fingers 180 of the contact zone 116 of the second terminal base 104 through which the corresponding male terminal 400 first enters.

With the intergration of the spacer members or structures 300 of the female terminal 100 of this invention, tabs (referred to above in the discussions of the conventional terminals of FIGS. 1 and 2) are eliminated; thereby reducing scrap material during the manufacturing of the female terminal 100 of this invention; and the spacer members or structures 300 of the female terminal 100 of this invention maintains the proper contact interface gap 130*a*, unlike in the conventional terminal discussed, above, with respect to FIG. 3.

The present invention is not limited to the above-described embodiments; and various modifications in design, structural arrangement or the like may be used without departing from the scope or equivalents of the present invention.

We claim:

1. A terminal spring spacer, comprising:

a main body having an upper member and a lower member;

a central member respectively connected to said upper member and said lower member to form a closed loop with a central space, said central space accommodating therein first and second terminal bases of a female terminal;

a front member and a rear member respectively extending from said central member at an angled direction inward toward said central space, wherein said upper member and said lower member control an expansion of a gap between said first and second terminal bases away from each other, and wherein said front member and said rear member control a contraction of said gap of said first and second terminal bases toward each other, thereby directly controlling an interface gap extending towards opening and closing directions between said first and second terminals of said female terminal.

2. The terminal spring spacer according to claim 1, wherein said front member and said rear member of said terminal spring spacer are respectively connected to first and second transition zones of said first and second terminal bases of said female terminal.

3. The terminal spring spacer according to claim 1, wherein said terminal spring spacer controls said gap between transition zones of said first and second terminal bases of said female terminal.

4. The terminal spring spacer according to claim 1, wherein said terminal spring spacer controls said gap between contact zones of said first and second terminal bases of said female terminal.

5. The terminal spring spacer according to claim 1, wherein said terminal spring spacer controls an interface gap size or width located through said interface gap at least between male terminal receiving ends of said first and second terminal bases, through a gap between contact zones of said first and second terminal bases of said female terminal, and a gap between transition zones of said first and second terminal bases of said female terminal.

6. The terminal spring spacer according to claim 5, wherein said terminal spring spacer controls said interface gap between said male terminal receiving ends of said first and second terminal bases, said gap between contact zones of said first and second terminal bases of said female terminal, and said gap between transition zones of said first and second terminal bases of said female terminal for accommodating therein a corresponding male terminal.

7. The terminal spacer according to claim 1, wherein said terminal spring spacer is integrally, contiguously, or unitarily connected to said terminal spring as a single piece.

8. The terminal spacer according to claim 4, wherein said terminal spring spacer provides spring functions for said contact contact zones of said first and second terminal bases of said female terminal, and front portions of a terminal spring, while maintaining a correct gap therebetween.

9. A female terminal that substantially maintains an interface gap for receiving therein a corresponding male terminal, said female terminal comprising:

a pair of a first terminal base and a second terminal base, each of said first terminal base and said second terminal base having a contact zone, a transition zone, and a terminal (wire) zone, said transition zone being located between said contact zone and said terminal (wire) zone along a direction through which said male terminal travels;

a terminal spring substantially containing therein at least said transition zones of said first and second terminal bases, each of opposing sides of said terminal spring having a terminal spring spacer for maintaining a width or size of at least an interface gap between end portions of said first and second terminal bases, said terminal spring having a front portion and a rear portion, wherein said terminal spring spacer is connected to said rear portion of said terminal spring.

10. The female terminal according to claim 9, wherein said terminal spring spacer is comprised of an upper portion, a lower portion, a front portion, and a rear portion, wherein said upper portion of said terminal spring spacer is connected to an upper portion of a rear portion of said terminal spring, and wherein said lower portion of said terminal spring spacer is connected to a lower portion of said rear portion of said terminal spring.

11. The female terminal according to claim 10, wherein a front portion and a rear portion of said terminal spring spacer is connected to either one of opposing sides of said transition zones of said pair of said first terminal base and said second terminal base.

12. The female terminal according to claim 10, wherein said first terminal base is structurally identical to said second terminal base, said second terminal base being a flip over of said first terminal base.

13. The female terminal according to claim 12, wherein each of said contact zones of said first and second terminal bases includes a set of substantially flexible blades respectively extending from said transition zones of said first and second terminal bases, each end of said substantially flexible blades of said contact zones respectively extends outwardly, wherein said terminal spring spacer, which is connected to either one of said opposing sides of said transition zones of said first and second terminal bases, maintains an interface gap between said outwardly extending ends of said contact zones of said first and second terminal bases.

14. The female terminal according to claim 9, wherein said terminal spring, including said terminal spacer attached thereto, is integrally, contiguously, or unitarily connected together as a single unit.

15. The female terminal according to claim 14, wherein each of said first and second terminal bases is made of a material consisting essentially of copper and aluminum with a surface that is covered with a material consisisting essentially of silver, gold, nickel, and tin.

* * * * *